(12) United States Patent
Bhat et al.

(10) Patent No.: US 11,204,875 B1
(45) Date of Patent: Dec. 21, 2021

(54) SOFTWARE ASSISTED DATA ADDRESS PREFETCH

(71) Applicant: International Business Machines Corporation, Armonk, NY (US)

(72) Inventors: Puneeth A. H. Bhat, Bangalore (IN); Venkatesh KR, Rompicherla (IN)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 16/931,765

(22) Filed: Jul. 17, 2020

(51) Int. Cl.
*G06F 12/00* (2006.01)
*G06F 12/0862* (2016.01)

(52) U.S. Cl.
CPC .... *G06F 12/0862* (2013.01); *G06F 2212/602* (2013.01)

(58) Field of Classification Search
CPC .................. G06F 12/0862; G06F 2212/602
See application file for complete search history.

(56) References Cited

U.S. PATENT DOCUMENTS

| | | | | |
|---|---|---|---|---|
| 6,799,263 | B1* | 9/2004 | Morris ................... | G06F 9/3802 711/119 |
| 2006/0161758 | A1* | 7/2006 | Bradford ............. | G06F 12/1036 711/202 |
| 2006/0174059 | A1* | 8/2006 | Granston ............ | G06F 12/0862 711/110 |
| 2009/0198906 | A1* | 8/2009 | Armilli ............... | G06F 12/1027 711/137 |
| 2009/0198948 | A1* | 8/2009 | Arimilli .............. | G06F 12/0862 711/203 |
| 2009/0198950 | A1* | 8/2009 | Arimilli .............. | G06F 12/0862 711/205 |
| 2015/0331677 | A1 | 11/2015 | Kimura | |
| 2016/0188476 | A1 | 6/2016 | Yu et al. | |
| 2017/0060751 | A1 | 3/2017 | Okawara et al. | |
| 2017/0177349 | A1* | 6/2017 | Yount ................. | G06F 15/8007 |
| 2018/0121360 | A1* | 5/2018 | Chen ................... | G06F 12/0862 |

OTHER PUBLICATIONS

Srivastava et al., "Pointer-Chase Prefetcher for Linked Data Structures", arXiv:1801.08088, Jan. 19, 2018, 12 pages, <https://arxiv.org/pdf/1801.08088.pdf>.

Yu et al., "IMP: Indirect Memory Prefetcher", Proceedings of the 48th Annual IEEE/ACM International Symposium on Microarchitecture (MICRO-48), Waikiki, Hawaii, Dec. 5-9, 2015, 13 pages, <people.csail.mit.edu/yxy/pubs/imp.pdf>.

* cited by examiner

*Primary Examiner* — Prasith Thammavong
(74) *Attorney, Agent, or Firm* — Edward J. Wixted, III

(57) ABSTRACT

Three new software instructions assist a processor in performing indirect prefetching, and managing a next-to-prefetch address list. The software instructions populate hardware register locations according to a hardware register description comprising a data structure of at least seven fields. Multiple instances of the data structure, shared across multiple respectively corresponding threads running concurrently, comprise an indirect-prefetch-tracker table. The indirect-prefetch-tracker table assists the processor to efficiently perform indirect prefetching, from random (not necessarily contiguous) memory locations, and reduces processor core real estate dedicated to control and management of data prefetch and loading operations.

18 Claims, 4 Drawing Sheets

SOFTWARE ASSISTED DATA ADDRESS PREFETCH

BACKGROUND

The present invention relates generally to the field of data address prefetching, and more particularly to software assisted data address prefetching by a processor for linked indirect memory access.

In computer science, data is fetched from memory, storage, cache, etc., and made available to a processor as the data is needed. Prefetching is a technique to improve fetching performance, by anticipating data that the processor may need soon, and fetching the data before the need for the data is confirmed.

SUMMARY

According to an aspect of the present invention, there is a method, computer program product and/or system for prefetching memory locations by a processor that performs the following operations (not necessarily in the following order): (i) loading a next address offset to an indirect prefetch offset register; (ii) loading a base address to an indirect prefetch base address register; (iii) receiving a prefetch level mask; (iv) in response to receiving the prefetch level mask: setting a first indirect prefetch control flag to a first state based on the prefetch level mask, and setting a second indirect prefetch control flag to a first state based on the prefetch level mask; and (v) initiating a prefetch loop, based on the next address offset, the base address, the first indirect prefetch control flag, and the second indirect prefetch control flag.

DETAILED DESCRIPTION

Figure 1:
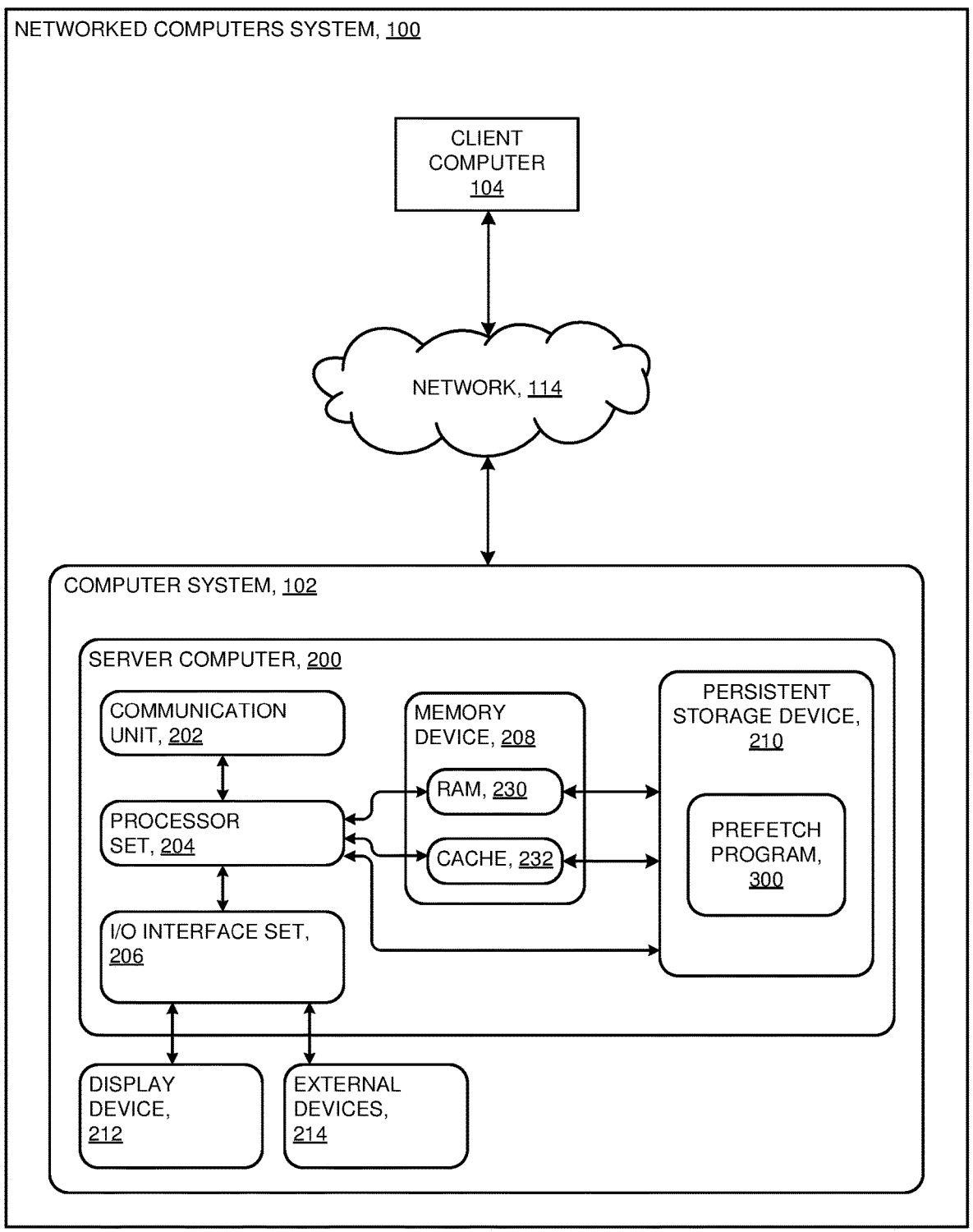
FIG. 1 is a block diagram of a system in accordance with at least one embodiment of the present invention.

Some embodiments of the present invention improve data prefetching using new asynchronous conditional load software instructions for prefetching random memory addresses. Simplified hardware prefetch logic operates in non-blocking mode. Three new hardware-level instructions, a hardware register description, an indirect prefetch tracking table, and multiple prefetch levels, operate in conjunction to enable hardware logic to prefetch random memory locations with improved performance.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: computer system 102; client computer 104; communication network 114; server computer 200; communication unit 202; processor set 204; input/output (I/O) interface set 206; memory device 208; persistent storage device 210; display device 212; external devices 214; random access memory (RAM 230); cache 232; and prefetch program 300.

Computer system 102 is, in many respects, representative of the various computer sub-system(s) in the present invention. Accordingly, several portions of computer system 102 will now be discussed in the following paragraphs.

Computer system 102 may be a laptop computer, tablet computer, netbook computer, personal computer (PC), a desktop computer, a personal digital assistant (PDA), a smart phone, or any programmable electronic device capable of communicating with the client sub-systems via communication network 114. Prefetch program 300 is a collection of machine readable instructions and/or data that is used to create, manage, and control certain software functions that will be discussed in detail, below, in the Example Embodiment sub-section of this Detailed Description section.

Computer system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems.

Computer system 102 is shown as a block diagram with many double arrows. These double arrows (no separate reference numerals) represent a communications fabric, which provides communications between various components of computer system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory device 208 and persistent storage device 210 are computer-readable storage media. In general, memory device 208 can include any suitable volatile or non-volatile computer-readable storage media. It is further noted that, now and/or in the near future: (i) external devices 214 may be able to supply, some or all, memory for computer system 102; and/or (ii) devices external to computer system 102 may be able to provide memory for computer system 102.

Prefetch program 300 is stored in persistent storage device 210 for access and/or execution by one or more of the respective computer processor set 204, usually through one or more memories of memory device 208. Persistent storage device 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage device 210.

Prefetch program 300 may include both machine readable and performable instructions and/or substantive data (that is, the type of data stored in a database). In this particular embodiment, persistent storage device 210 includes a magnetic hard disk drive. To name some possible variations, persistent storage device 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer-readable storage medium that is also part of persistent storage device 210.

Communications unit 202, in these examples, provides for communications with other data processing systems or devices external to computer system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external devices 214. External devices 214 will may include devices such as a keyboard, keypad, a touch screen, and/or some other suitable input device. External devices 214 can also include portable computer-readable storage media such as, for example, thumb drives, portable optical or magnetic disks, and memory cards. Software and data used to practice embodiments of the present invention, for example, prefetch program 300, can be stored on such portable computer-readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature, herein, is used merely for convenience, and, thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
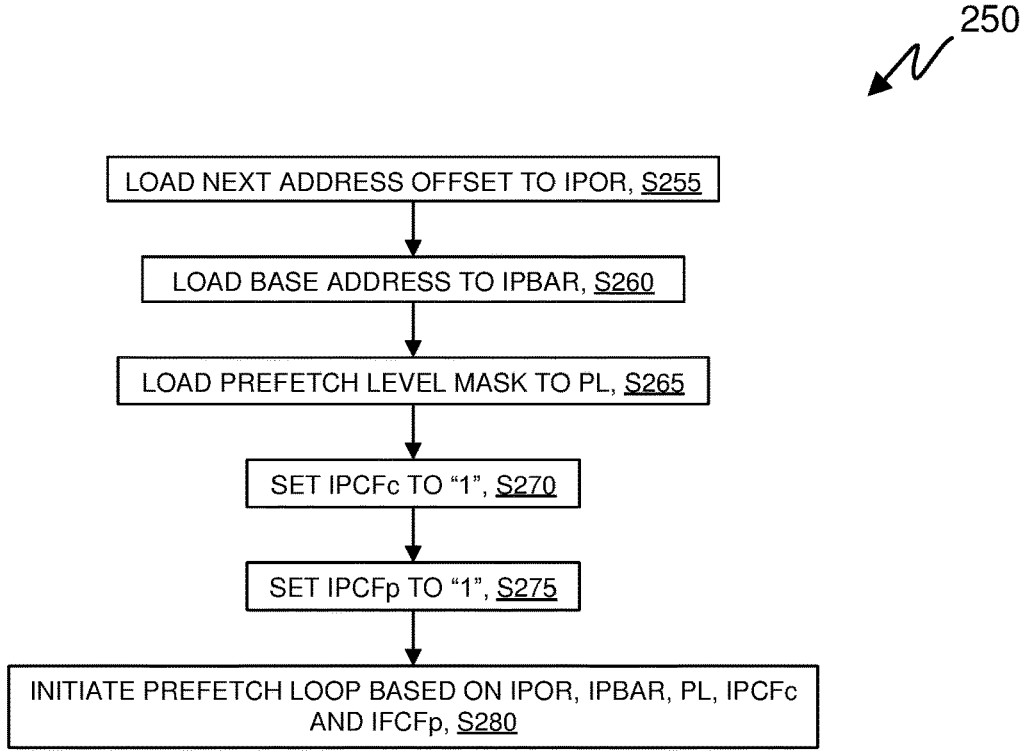
FIG. 2 is a flowchart showing a method performed, at least in part, in accordance with at least one embodiment of the present invention.
Figure 3:
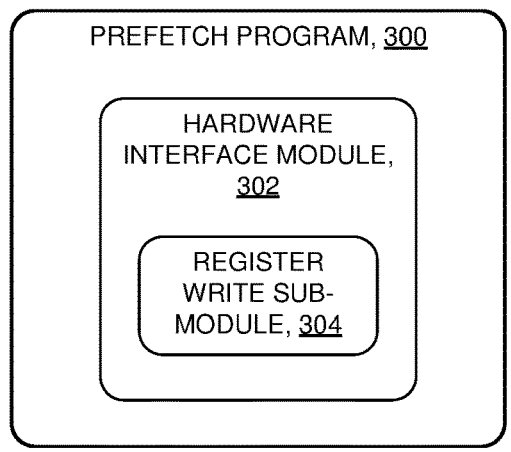
FIG. 3 is a block diagram showing a machine logic (for example, software) portion of a system in accordance with at least one embodiment of the present invention.

FIG. 2 shows flowchart 250 depicting a method according to the present invention. FIG. 3 shows prefetch program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where register write sub-module 304, of hardware interface module 302, of prefetch program 300, loads a next address offset to an indirect prefetch offset register of processor set 204, of server computer 200, of computer system 102 (see FIG. 1).

Processing proceeds at operation S260, where register write sub-module 304 loads a base address to an indirect prefetch base address register of processor set 204 (see FIG. 1).

Processing proceeds at operation S265, where register write sub-module 304 loads prefetch level mask to a two-bit prefetch level indicator of processor set 204 (see FIG. 1). The two-bit prefetch level indicator provides four levels of prefetch aggressiveness. In some embodiments, the prefetch level mask and the prefetch level indicator each comprise more than two bits, for example three bits which provides for eight levels of prefetch aggressiveness, or four bits for 16 levels of prefetch aggressiveness.

Processing proceeds at operation S270, where register write sub-module 304 sets a first indirect prefetch control flag to "1".

Processing proceeds at operation S275, where register write sub-module 304 sets a second indirect prefetch control flag to "1".

A prefetch level (PL) flag comprises two bits: the first indirect prefetch control flag; and the second indirect prefetch control flag (see operations S270 and S275 above). The two bits of the prefetch level flag, together, specify a prefetch logic aggressiveness level. The prefetch level flag is described in more detail below, under the sub-heading "Prefetch Level Flag" in the Further Comments And/Or Embodiments sub-section of this Detailed Description section.

Processing proceeds at operation S280, where hardware interface module 302, based on the second prefetch control flag, triggers processor set 204 to initiate a prefetch loop. The prefetch is based on one or more of the next address offset, the base address, the prefetch level mask, the first indirect prefetch control flag, and the second indirect prefetch control flag.

III. Further Comments and/or Embodiments

Some embodiments of the present invention recognize the following facts, potential problems and/or potential areas for improvement with respect to the current state of the art: conventional stream based hardware/software prefetching helps improve performance of continuous or stride pattern load access. However, since pointer based data structures (such as linked lists, for instance) are created dynamically based on program requirements, they are not spatially co-located in memory. This leads to degradation of the program performance as these types of randomly dispersed data cause frequent cache misses. Moreover, because memory access lacks any pattern, conventional hardware prefetching is not helpful. Consequently, there is a need for software enabled prefetching for these kinds of memory access.

Some embodiments of the present invention may include one, or more, of the following features, characteristics, and/or advantages: (i) introduces three new software instructions to assist the hardware in notifying the indirect prefetching, and managing the next-to-prefetch address list; (ii) uses a simple, small indirect-prefetch-tracking table with seven fields shared across simultaneous multi-threads (SMT) as described below with respect to FIG. 4; (iii) software assists and controls the hardware asynchronously with the three new instructions, and the hardware manages the prefetching using a small sized register table; (iv) no software overhead needed to maintain large data structures, to maintain the prefetch address list; (v) no software overhead needed for maintaining cache address, next target address; (vi) reduces processor core real estate used for data prefetch and loading; (vii) instructions operate asynchronously; (viii) instructions comprise the entire prefetch logic; (ix) instructions cause no bottleneck in the pipeline; and/or (x) makes new use of conventional core load units, cache units and other hardware resources for data prefetch and loading.

Figure 4:
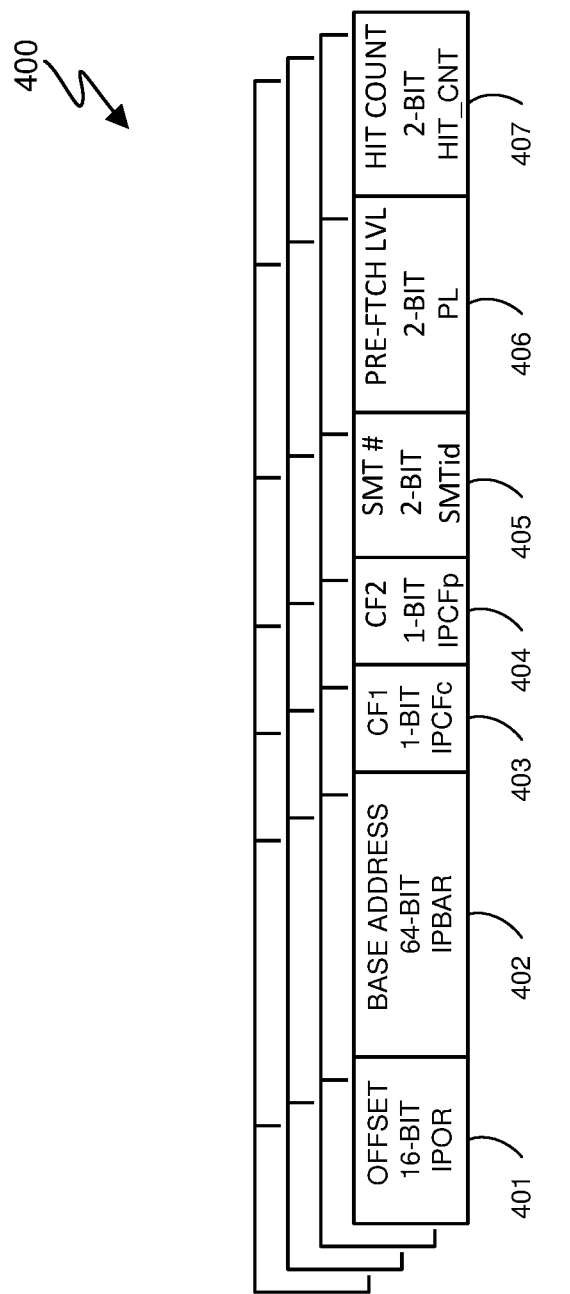
FIG. 4 is a block diagram showing an indirect prefetch tracking table, comprising a plurality of hardware register descriptions, in accordance with at least one embodiment of the present invention.

FIG. 4 is a block diagram showing hardware register description 400 in accordance with at least one embodiment of the present invention. Hardware register description 400 comprises the following elements:

IPOR 401—Indirect Prefetch Offset Register (16 bits)—specifies the offset, from a base address (BA), of the "next" prefetch address;

IPBAR 402—Indirect Prefetch Base Address Register (64 bits)—specifies the base address;

IPCFc 403—Indirect Prefetch Control Flag 'c' bit (1 bit)—handles load/restore conditions;

IPCFp 404—Indirect Prefetch Control Flag 'p' bit (1 bit)—enables and disables the prefetch logic;

SMTid 405—(2-bits)—identifies (represents) the thread number (Note: In some embodiments, SMTid is longer than 2 bits to allow for identifying more than four concurrent threads);

PL 406—Prefetch Level mask (2-bits)—directs (sets) the prefetch aggressiveness; and HitCnt 407—counter (2-bits)—tracks the load miss queue (LMQ) hit counter and disables the prefetch logic.

Software Logic.

Software instructions and logic, in accordance with some embodiments of the present invention, comprise the following new instructions: dcbtis; dcbtil; and dcbtie. Functions performed by these new instructions are described below.

Dcbtis Offset, BA, LMASK
   specifies prefetch starting address (BA), offset of "next-address" (offset) and a 2-bit prefetch-level indicator (LMASK);
   loads offset to IPOR;
   loads BA to IPBAR;
   loads "LMASK" to PL (if LMASK does not equal 0). In some embodiments, when an application or a library is compiled, a compiler determines a value of LMASK based on a profile-directed feedback mechanism. In some embodiments, a compiler enables a compile-time flag for the user to explicitly specify a value for LMASK. LMASK enables more flexibility by specifying how deep prefetch can go;
   sets flag IPCFc=1; and
   sets flag IPCFp=1 to start the hardware prefetch loop.
dcbtil—asynchronous check and load instruction, performs two operations based on IPCFc flag:
   if IPCFc=1–finishes/executes the instruction as a "nop" (no operation);
   if IPCFc=0—loads content present in address IPOR+IPBAR into IPBAR, and sets flag IPCFc=1
dcbtie—specifies ending of prefetch loop
   sets IPCFp=0 to stop prefetching.
Hardware Logic.

Hardware logic, in accordance with some embodiments of the present invention, comprises:
   Let CLS=Cache Line Size.
   Let PA=prefetch address.
   if IPCFp flag=1, perform the prefetch loop logic below (lines 1 through 10):
      1) Wait (sleep) until IPCFc==1;
      2) PA=IPBAR+IPOR;
      3) If PL==1: send two prefetch requests for lines PA+CLS, and PA−CLS;
      4) Else if PL==2: send two prefetch requests for lines PA−CLS, and PA−(2×CLS);
      5) Else if PL==3:
      5a) Set previous cache lines=ceiling(IPOR/CLS), where the ceiling(x) function means the smallest integer greater than or equal to x;
      5b) Send prefetch requests for all the previous cache lines;
      6) Try to insert an entry into LMQ for PA;
      7) If LMQ entry exists for PA:
      7a) Decrement HitCnt;
      7b) If HitCnt==0, then reset IPCFp flag to 0 and end the prefetch loop;
      8) Else,
      8a) wait/sleep until trigger raised from LMQ for "Data-Coming" signal;
      8b) Set HitCnt=3;
      9) Set IPCFc=0;
      10) Goto Step 1.

With respect to the indirect prefetch control flag 'p' bit (IPCFp), in some embodiments, the prefetch logic is gated by the IPCFp flag. The hardware (processor, or processor cores, for example) enters the prefetch logic based on setting of the IPCFp flag to "1". The prefetch logic is switched on or off based on the value of IPCFp (respectively "1" or "0").

Prefetch Level Flag:

The prefetch level (PL) flag comprises two bits, which together specify aggressiveness of the prefetch logic as follows:
   [00]—No additional prefetch (least aggressive)
   [01]—Prefetch one line previous, and one line after the current line.
   [10]—Prefetch two lines previous to the current line.
   [11]—Prefetch all lines, previous to the current line, belonging to a common structure (most aggressive).

Figure 5:
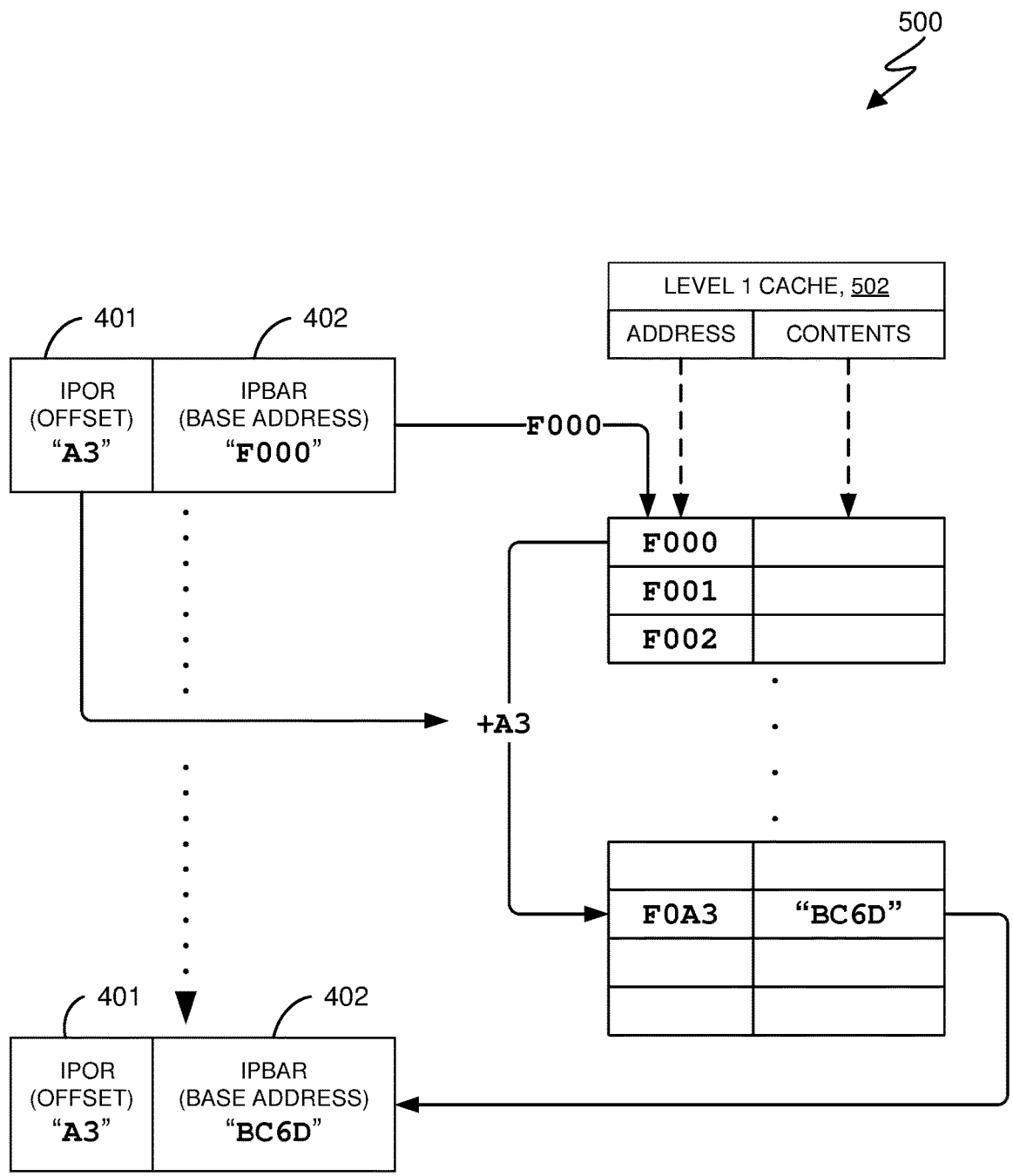
FIG. 5 is a memory block diagram in accordance with at least one embodiment of the present invention.

Memory block diagram 500 of FIG. 5 shows an approach for indirect prefetch addressing in accordance with some embodiments of the present invention. In the embodiment of FIG. 5, a processor comprises IPOR 401, IPBAR 402 (both of which are processor registers, or designated bits of one or more registers), and level 1 cache 502. Indirect prefetch offset "A3" is present in IPOR 401. Base address "F000" is present in IPBAR 402. If IPCFc 403 (see FIG. 4) is "0", an indirect prefetch address in level 1 cache 502 is calculated as follows: indirect prefetch offset "A3" (contents of IPOR 401) is added to base address "F000" (contents of IPBAR 402), to arrive at level 1 cache 502 address F0A3. The contents of address F0A3 in level 1 cache 502 ("BC6D") is then written back to IPBAR 402. The processor then performs a prefetch based on the contents of IPBAR 402.

Some embodiments of the present invention may include one, or more, of the following features, characteristics, and/or advantages: (i) assists hardware prefetching with asynchronous conditional load software instruction; (ii) performs hardware prefetch by reusing existing hardware resource and minimal "indirect-prefetch-tracking" table; (iii) simplifies hardware prefetch logic operating in non-blocking mode, to improve performance; (iv) aids aggressive prefetching of all cache lines of the current structure, with software controlled hardware; (v) provides a software based prefetch solution for a program which has a random pattern of data access; (vi) detects and prefetches random memory accesses, for example, as in a linked data structure; (vii) defines a software enabled hardware logic to prefetch randomly linked memory accesses; (viii) prefetches related cache lines of interest alongside the main line using different prefetch levels; (ix) solves random linked memory accesses using software-influenced hardware driver logic; (x) reuses existing load store units (LSUs) and address generation units without adding any overhead—the hardware maintains simple registers to hold the offset and base data address; (xi) introduces a concept of various prefetch levels, to prefetch multiple cache lines instead of just one line having a potential next address; (xii) makes use of existing hardware resources; and/or (xiii) defines software monitored prefetching using an "asynchronous conditional load instruction", which performs prefetch using existing load unit without blocking the actual pipeline, and not adding any hardware overhead.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard as to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and/or application-specific integrated circuit (ASIC) based devices.

What is claimed is:

1. A computer-implemented method for prefetching memory locations by a processor, the method comprising:
    loading a next address offset to an indirect prefetch offset register;
    loading a base address to an indirect prefetch base address register;
    receiving a prefetch level mask;
    in response to receiving the prefetch level mask:
        setting a first indirect prefetch control flag to a first state based on the prefetch level mask, and
        setting a second indirect prefetch control flag to a first state based on the prefetch level mask; and
    initiating a prefetch loop, based on the next address offset, the base address, the first indirect prefetch control flag, and the second indirect prefetch control flag.

2. The method of claim 1, further comprising:
    determining the first indirect prefetch control flag is set to a second state;
    in response to determining the first indirect prefetch control flag is set to the second state:
        determining a prefetch address based on a combination of the next address offset and the base address,
        loading the prefetch address into the indirect prefetch base address register, and
        setting the first indirect prefetch control flag to the first state.

3. The method of claim 1, wherein the prefetch level indicates a prefetch aggressiveness selected from the group consisting of: no additional prefetch; prefetch one line previous to a current line and one line after the current line; prefetch two lines previous to the current line; and prefetch all lines, previous to the current line, belonging to a common structure.

4. The method of claim 1, further comprising:
    generating an indirect prefetch tracking table data structure comprising a plurality of hardware register descriptions, wherein each hardware register description comprises information indicative of:
    contents of the indirect prefetch offset register;
    contents of the indirect prefetch base address register;
    a state of the first indirect prefetch control flag;
    a state of the second indirect prefetch control flag;
    a thread identifier;
    contents of the prefetch level mask; and
    contents of a load miss queue hit counter.

5. The method of claim 1, further comprising:
controlling load/restore conditions based on the first indirect prefetch control flag; and
controlling prefetch enable/disable logic based on the second indirect prefetch control flag.

6. The method of claim 1, further comprising:
setting the second indirect prefetch control flag to a second state; and
stopping the prefetch loop, based on the second indirect prefetch control flag.

7. A computer program product, for prefetching memory locations by a processor, comprising:
one or more computer readable storage media, and program instructions collectively stored on the one or more computer readable storage media, the program instructions comprising instructions programmed to perform:
loading a next address offset to an indirect prefetch offset register;
loading a base address to an indirect prefetch base address register;
receiving a prefetch level mask;
in response to receiving the prefetch level mask:
setting a first indirect prefetch control flag to a first state based on the prefetch level mask, and
setting a second indirect prefetch control flag to a first state based on the prefetch level mask; and
initiating a prefetch loop, based on the next address offset, the base address, the first indirect prefetch control flag, and the second indirect prefetch control flag.

8. The computer program product of claim 7, further comprising program instructions programmed to perform:
determining the first indirect prefetch control flag is set to a second state;
in response to determining the first indirect prefetch control flag is set to the second state:
determining a prefetch address based on a combination of the next address offset and the base address,
loading the prefetch address into the indirect prefetch base address register, and
setting the first indirect prefetch control flag to the first state.

9. The computer program product of claim 7, wherein the prefetch level indicates a prefetch aggressiveness selected from the group consisting of: no additional prefetch; prefetch one line previous to a current line and one line after the current line; prefetch two lines previous to the current line; and prefetch all lines previous to the current line belonging to a common structure.

10. The computer program product of claim 7, further comprising program instructions programmed to perform:
generating an indirect prefetch tracking table data structure comprising a plurality of hardware register descriptions, wherein each hardware register description comprises information indicative of:
contents of the indirect prefetch offset register;
contents of the indirect prefetch base address register;
a state of the first indirect prefetch control flag;
a state of the second indirect prefetch control flag;
a thread identifier;
contents of the prefetch level mask; and
contents of a load miss queue hit counter.

11. The computer program product of claim 7, further comprising program instructions programmed to perform:
controlling load/restore conditions based on the first indirect prefetch control flag; and
controlling prefetch enable/disable logic based on the second indirect prefetch control flag.

12. The computer program product of claim 7, further comprising program instructions programmed to perform:
setting the second indirect prefetch control flag to a second state; and
stopping the prefetch loop, based on the second indirect prefetch control flag.

13. A computer system, for prefetching memory locations by a processor, comprising:
a processor set; and
one or more computer readable storage media;
wherein:
the processor set is structured, located, connected and/or programmed to run program instructions stored on the one or more computer readable storage media; and
the program instructions include instructions programmed to perform:
loading a next address offset to an indirect prefetch offset register;
loading a base address to an indirect prefetch base address register;
receiving a prefetch level mask;
in response to receiving the prefetch level mask:
setting a first indirect prefetch control flag to a first state based on the prefetch level mask, and
setting a second indirect prefetch control flag to a first state based on the prefetch level mask; and
initiating a prefetch loop, based on the next address offset, the base address, the first indirect prefetch control flag, and the second indirect prefetch control flag.

14. The computer system of claim 13, further comprising program instructions programmed to perform:
determining the first indirect prefetch control flag is set to a second state;
in response to determining the first indirect prefetch control flag is set to the second state:
determining a prefetch address based on a combination of the next address offset and the base address,
loading the prefetch address into the indirect prefetch base address register, and
setting the first indirect prefetch control flag to the first state.

15. The computer system of claim 13, wherein the prefetch level indicates a prefetch aggressiveness selected from the group consisting of: no additional prefetch; prefetch one line previous to a current line and one line after the current line; prefetch two lines previous to the current line; and prefetch all lines previous to the current line belonging to a common structure.

16. The computer system of claim 13, further comprising program instructions programmed to perform:
generating an indirect prefetch tracking table data structure comprising a plurality of hardware register descriptions, wherein each hardware register description comprises information indicative of:
contents of the indirect prefetch offset register;
contents of the indirect prefetch base address register;
a state of the first indirect prefetch control flag;
a state of the second indirect prefetch control flag;
a thread identifier;
contents of the prefetch level mask; and
contents of a load miss queue hit counter.

17. The computer system of claim 13, further comprising program instructions programmed to perform:
- controlling load/restore conditions based on the first indirect prefetch control flag; and
- controlling prefetch enable/disable logic based on the second indirect prefetch control flag.

18. The computer system of claim 13, further comprising program instructions programmed to perform:
- setting the second indirect prefetch control flag to a second state; and
- stopping the prefetch loop, based on the second indirect prefetch control flag.

\* \* \* \* \*